United States Patent
Tsou et al.

(10) Patent No.: US 11,528,592 B2
(45) Date of Patent: Dec. 13, 2022

(54) APPARATUSES AND METHODS FOR ROBUST MOVING BETWEEN A ROAMING 3GPP NETWORK AND A NON-3GPP NETWORK

(71) Applicant: MEDIATEK INC., Hsinchu (TW)

(72) Inventors: Yung-Liang Tsou, Hsinchu (TW); Hao-Chen Chou, Hsinchu (TW); Szu-Chieh Chiu, Hsinchu (TW); Chien-Yi Wang, Hsinchu (TW); Rohit Naik, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 30 days.

(21) Appl. No.: 16/983,160

(22) Filed: Aug. 3, 2020

(65) Prior Publication Data
US 2022/0038885 A1 Feb. 3, 2022

(51) Int. Cl.
*H04W 36/00* (2009.01)
*H04W 8/12* (2009.01)
*H04W 48/00* (2009.01)
*H04W 36/32* (2009.01)
*H04W 76/30* (2018.01)

(52) U.S. Cl.
CPC ......... *H04W 8/12* (2013.01); *H04W 36/0022* (2013.01); *H04W 36/32* (2013.01); *H04W 48/17* (2013.01); *H04W 76/30* (2018.02)

(58) Field of Classification Search
CPC combination set(s) only.
See application file for complete search history.

(56) References Cited

U.S. PATENT DOCUMENTS

| | | | |
|---|---|---|---|
| 2007/0026862 A1* | 2/2007 | Hicks | H04W 36/30 455/436 |
| 2011/0090870 A1* | 4/2011 | Ronneke | H04W 76/27 370/331 |
| 2013/0322300 A1* | 12/2013 | Landais | H04W 48/18 370/259 |
| 2015/0036611 A1* | 2/2015 | Kim | H04W 36/0022 370/329 |
| 2017/0005914 A1* | 1/2017 | Edge | H04W 8/04 |
| 2018/0227760 A1* | 8/2018 | Foti | H04L 63/0884 |
| 2021/0136633 A1* | 5/2021 | Zetterlund | H04W 36/14 |

* cited by examiner

*Primary Examiner* — Lakeram Jangbahadur
(74) *Attorney, Agent, or Firm* — McClure, Qualey & Rodack, LLP

(57) ABSTRACT

A method for robust moving between a roaming Third Generation Partnership Project (3GPP) network and a non-3GPP network is provided. The method includes the steps of: connecting with a home 3GPP network over one of a roaming 3GPP network and a non-3GPP network by a User Equipment (UE); performing a first initial attach procedure with the home 3GPP network over the other of the roaming 3GPP network and the non-3GPP network by the UE in response to the UE moving from the one of the roaming 3GPP network and the non-3GPP network to the other of the roaming 3GPP network and the non-3GPP network; and keeping the connection over the one of the roaming 3GPP network and the non-3GPP network by the UE during the first initial attach procedure over the other of the roaming 3GPP network and the non-3GPP network.

14 Claims, 5 Drawing Sheets

APPARATUSES AND METHODS FOR ROBUST MOVING BETWEEN A ROAMING 3GPP NETWORK AND A NON-3GPP NETWORK

BACKGROUND OF THE APPLICATION

Field of the Application

The application generally relates to mobile communications, and more particularly, to apparatuses and methods for robust moving between a roaming Third Generation Partnership Project (3GPP) network and a non-3GPP network.

Description of the Related Art

In a typical mobile communication environment, a User Equipment (UE) (also called Mobile Station (MS)), such as a mobile telephone (also known as a cellular or cell phone), or a tablet Personal Computer (PC) with wireless communications capability, may communicate voice and/or data signals with one or more service networks. The wireless communications between the UE and the service networks may be performed using various Radio Access Technologies (RATs), including RATs specified by the Third Generation Partnership Project (3GPP) (referred to herein as 3GPP RATs) and RATs not specified by 3GPP (referred to herein as non-3GPP RATs).

For example, the non-3GPP RATs may include Wireless-Fidelity (Wi-Fi) technology, Bluetooth (BT) technology, Zigbee technology, and others. The 3GPP RATs may include Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Long Term Evolution (LTE) technology, TD-LTE technology, LTE-Advanced (LTE-A) technology, New Radio (NR) technology, etc. In particular, GSM/GPRS/EDGE technology is also called 2G technology; WCDMA/CDMA-2000/TD-SCDMA technology is also called 3G technology; LTE/LTE-A/TD-LTE technology is also called 4G technology; and NR technology is also called 5G technology.

To an increasing extent, most UEs may support multiple RATs to provide users with more flexible mobile communications at all times. For example, a UE may support one or more 3GPP RATs and a non-3GPP RAT, wherein the non-3GPP RAT may provide better service quality at indoor environments than the 3GPP RAT(s), while the 3GPP RAT(s) may provide better service quality at outdoor environments than the non-3 GPP RAT.

For interoperability between 3GPP and non-3GPP networks, 3GPP has defined the interworking model between 3GPP and non-3GPP networks, which also allows a UE connected to a home 3GPP network to move between a roaming 3GPP network and a non-3GPP network. However, there are situation where the operators of the 3GPP networks may not support handovers of the UE between a roaming 3GPP network and a non-3GPP network.

BRIEF SUMMARY OF THE APPLICATION

In a conventional practice, when a UE connected to a home LTE network via a roaming LTE network is moving from the roaming LTE network to a Wi-Fi network, the UE will need to release the connection over the roaming LTE network before performing an initial attach procedure to establish a new connection over the Wi-Fi network. Unfortunately, this "break-before-make" procedure will inevitably cause a period of time of service unavailability to the UE and the user experience may worsen as a result of failure on the "make". Likewise, the same problem may arise when a UE connected to a home LTE network via a Wi-Fi network is moving from the Wi-Fi network to a roaming LTE network.

In order to solve the aforementioned problems, the present application proposes that a UE may keep the connection over one of the roaming 3GPP network and the non-3GPP network during the initial attach procedure over the other of the roaming 3GPP network and the non-3GPP network.

In one aspect of the application, a method is provided. The method comprises the following steps: connecting with a home 3GPP network over one of a roaming 3GPP network and a non-3GPP network by a UE; performing a first initial attach procedure with the home 3GPP network over the other of the roaming 3GPP network and the non-3GPP network by the UE in response to the UE moving from the one of the roaming 3GPP network and the non-3GPP network to the other of the roaming 3GPP network and the non-3GPP network; and keeping the connection over the one of the roaming 3GPP network and the non-3GPP network by the UE during the first initial attach procedure over the other of the roaming 3GPP network and the non-3GPP network.

In another aspect of the application, a UE comprising a first wireless transceiver, a second wireless transceiver, and a controller is provided. The first wireless transceiver is configured to perform wireless transmission and reception to and from a roaming 3GPP network. The second wireless transceiver is configured to perform wireless transmission and reception to and from a non-3GPP network. The controller is configured to connect with a home 3GPP network over one of the roaming 3GPP network and the non-3GPP network via the first wireless transceiver or the second wireless transceiver, perform a first initial attach procedure over the other of the roaming 3GPP network and the non-3GPP network via the first wireless transceiver or the second wireless transceiver in response to the UE moving from the one of the roaming 3GPP network and the non-3GPP network to the other of the roaming 3GPP network and the non-3GPP network, and keep the connection over the one of the roaming 3GPP network and the non-3GPP network during the first initial attach procedure over the other of the roaming 3GPP network and the non-3GPP network.

Other aspects and features of the present application will become apparent to those with ordinarily skill in the art upon review of the following descriptions of specific embodiments of the methods and the UEs for robust moving between a roaming 3GPP network and a non-3GPP network.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
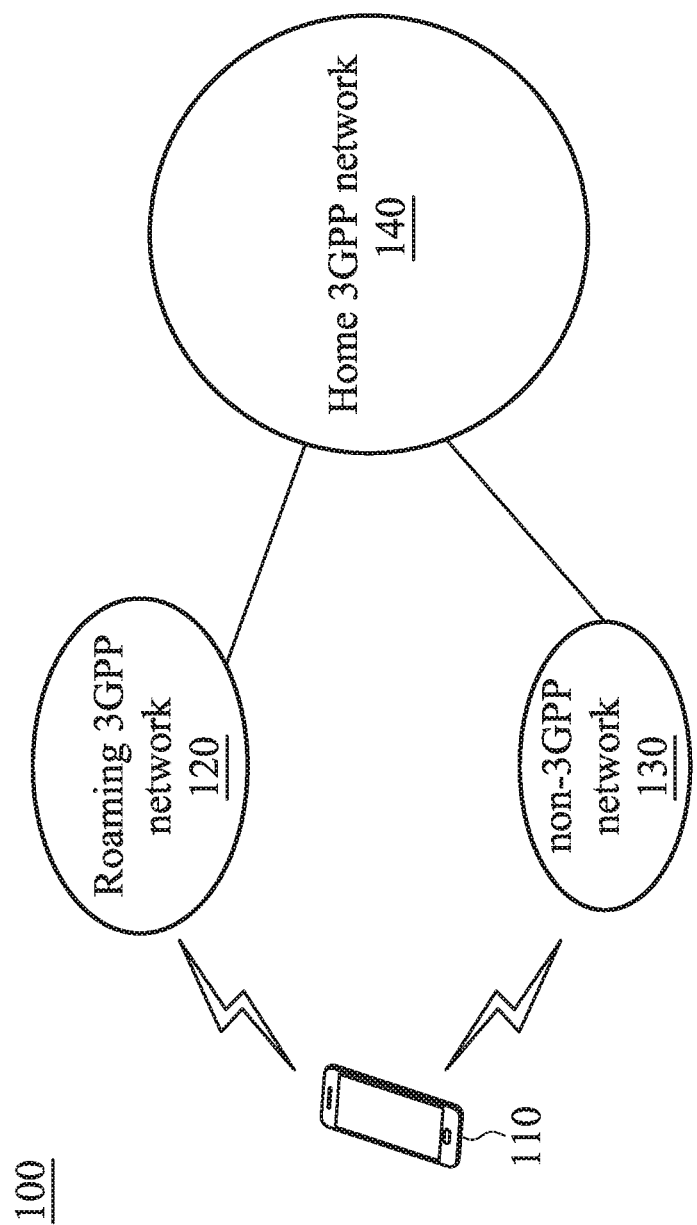
FIG. 1 is a block diagram of a wireless communication environment according to an embodiment of the application.

FIG. 1 is a block diagram of a wireless communication environment according to an embodiment of the application.

The wireless communication environment 100 includes a UE 110, a roaming 3GPP network 120, a non-3GPP network 130, and a home 3GPP network 140.

The UE 110 may be a feature phone, a smartphone, a tablet PC, a laptop computer, or any wireless communication device supporting the RATs utilized by the roaming 3GPP network 120, the non-3GPP network 130, and the home 3GPP network 140.

The roaming 3GPP network 120 may be a 2G network (e.g., GSM/EDGE/GPRS network), a 3G network (e.g., WCDMA network), a 4G network (e.g., LTE/LTE-A/TD-LTE network), or a 5G network (e.g., NR network), or any further evolution of the 5G network, depending on the RAT in use.

The non-3GPP network 130 may be a wireless network utilizing an RAT not specified by 3GPP. For example, the non-3GPP network 130 may be a Wireless-Fidelity (Wi-Fi) network or any future evolution of the Wi-Fi network, a BT network, a Zigbee network, a WiMAX network, a CDMA network, or a fixed network (e.g., a Digital Subscriber Line (DSL) network), depending on the RAT in use.

The home 3GPP network 140 may be a 4G network (e.g., LTE/LTE-A/TD-LTE network) or a 5G network (e.g., NR network), or any further evolution of the 5G network, depending on the RAT in use.

The UE 110 may be wirelessly connected to the home 3GPP network 140 via the roaming 3GPP network 120 or the non-3GPP network 130. For example, the UE 110 may communicate with the home 3GPP network 140 over the roaming 3GPP network 120 or the non-3GPP network 130 to obtain mobile services therefrom.

The roaming 3GPP network 120 may refer to an access network utilizing one of the RATs specified by 3GPP. For example, the roaming 3GPP network 120 may include a GSM EDGE Radio Access Network (GERAN), Universal Terrestrial Radio Access Network (UTRAN), Evolved UTRAN (E-UTRAN), or Next Generation Radio Access Network (NG-RAN).

In one embodiment, each of the roaming 3GPP network 120 and the home 3GPP network 140 may include an Evolved Universal Terrestrial Radio Access Network (E-UTRAN) and an Evolved Packet Core (EPC), if both the roaming 3GPP network 120 and the home 3GPP network 140 utilize the LTE/LTE-A/TD-LTE technology. According to the S8 Home Routing (S8HR) roaming network architecture specified by 3GPP, the Mobility Management Entity (MME) in the EPC of the roaming 3GPP network 120 is connected with the Home Subscriber Server (HSS) in the EPC of the home 3GPP network 140, and the Serving Gateway (S-GW) in the EPC of the roaming 3GPP network 120 is connected with the Packet Data Network Gateway (PDN-GW) in the EPC of the home 3GPP network 140.

In another embodiment, the roaming 3GPP network 120 and the home 3GPP network 140 may utilize different RATs. For example, the roaming 3GPP network 120 may be a 2/3/5G network, while the home 3GPP network 140 may be a 4G network. Alternatively, the roaming 3GPP network 120 may be a 2/3/4G network, while the home 3GPP network 140 may be a 5G network.

In one embodiment, the home 3GPP network 140 may be an LTE/LTE-A/TD-LTE network including an evolved Packet Data Gateway (ePDG) which enables interoperability between the home 3GPP network 140 and the non-3GPP network 130.

In another embodiment, the home 3GPP network 140 may be an NR network including a Non-3GPP InterWorking Function (N3IWF) which enables interoperability between the home 3GPP network 140 and the non-3GPP network 130.

Each of the roaming 3GPP network 120 and the non-3GPP network 130 is capable of providing the functions of processing radio signals, terminating radio protocols, and connecting the UE 110 with the home 3GPP network 140, while the home 3GPP network 140 is responsible for performing network-side authentication, and interfaces with a public/external data network (e.g., the Internet or an IP Multimedia Sub system (IMS) server).

Figure 2:
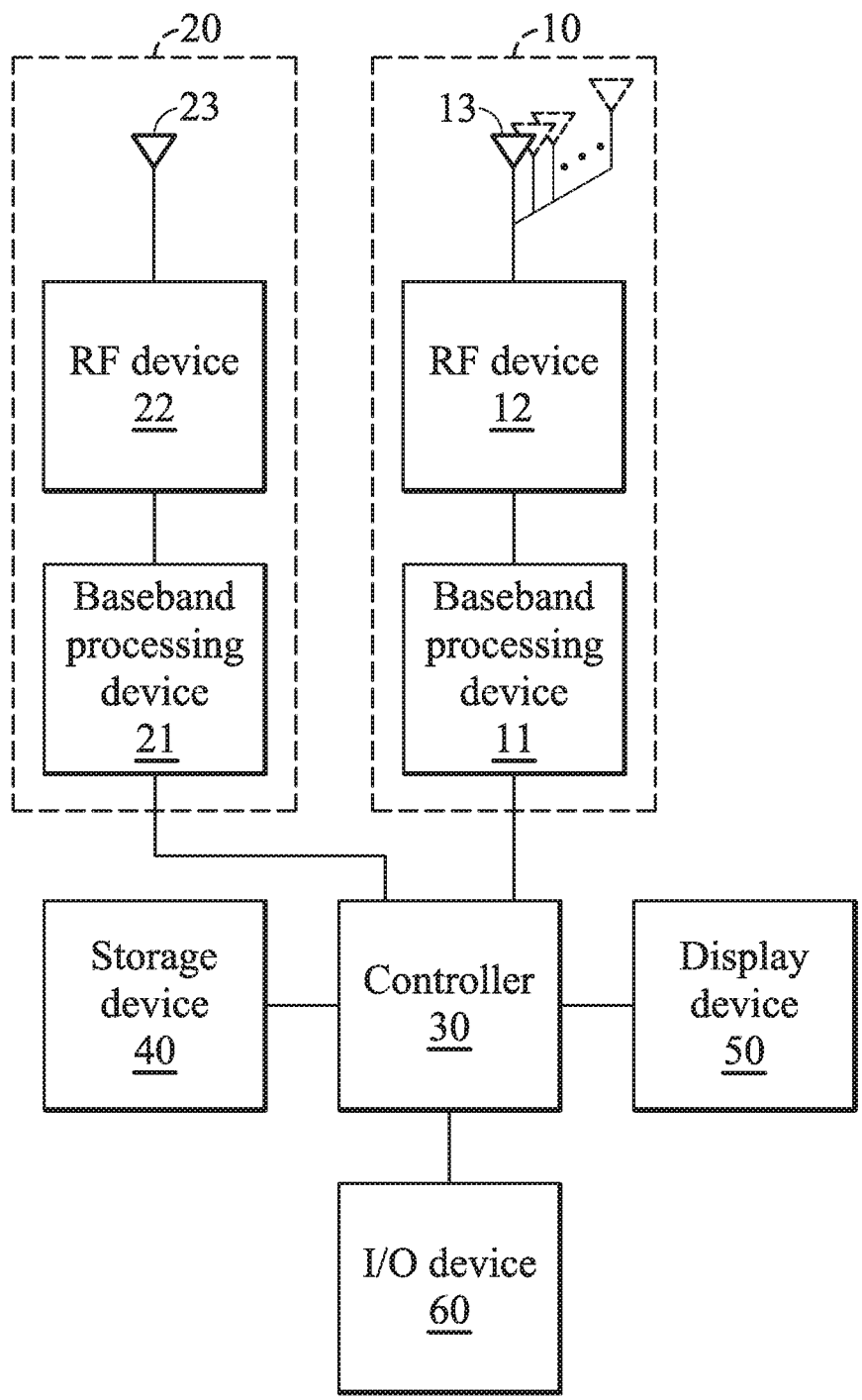
FIG. 2 is a block diagram illustrating the UE 110 according to an embodiment of the application.

FIG. 2 is a block diagram illustrating the UE 110 according to an embodiment of the application.

As shown in FIG. 2, the UE 110 may include two wireless transceivers 10 and 20, a controller 30, a storage device 40, a display device 50, and an Input/Output (I/O) device 60.

The wireless transceiver 10 is configured to perform wireless transmission and reception to and from the roaming 3 GPP network 120.

Specifically, the wireless transceiver 10 may include a baseband processing device 11, a Radio Frequency (RF) device 12, and antenna 13, wherein the antenna 13 may include an antenna array for beamforming.

The baseband processing device 11 is configured to perform baseband signal processing and control the communications between subscriber identity card(s) (not shown) and the RF device 12. In one embodiment, the subscriber identity card may be a Subscriber Identity Module (SIM) card or a Universal SIM (USIM) card, and may be inserted into a socket of the UE 110. In another embodiment, the subscriber identity card may be a virtual SIM/USIM or soft SIM/USIM, and may be embedded inside the UE 110 (e.g., may be written into the storage device 40). The baseband processing device 11 may contain multiple hardware components, such as a baseband processor, to perform the baseband signal processing, such as Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may include a mixer to multiply the baseband signals with a carrier oscillated in the radio frequency of the supported RATs, wherein the radio frequency may be 900 MHz, 1800

MHz or 1900 MHz utilized in GSM/EDGE/GPRS systems, or may be 900 MHz, 1900 MHz or 2100 MHz utilized in WCDMA systems, or may be 900 MHz, 2100 MHz, or 2.6 GHz utilized in LTE/LTE-A/TD-LTE systems, or any radio frequency (e.g., sub-6 GHz, 24.25 GHz-52.6 GHz for mmWave) utilized in 5G (e.g., NR) systems, or another radio frequency, depending on the RAT in use.

In another embodiment, the baseband processing device 11 and the RF device 12 may be incorporated into a single chip.

The wireless transceiver 20 is configured to perform wireless transmission and reception to and from the non-3GPP network 130. In one embodiment, the wireless transceiver 20 may be realized as a Wi-Fi chip if the RAT utilized by the non-3GPP network 130 is the Wi-Fi technology.

Specifically, the wireless transceiver 20 may include a baseband processing device 21, an RF device 22, and an antenna 23.

The baseband processing device 21 is configured to perform baseband signal processing. The baseband processing device 21 may contain multiple hardware components, such as a baseband processor, to perform the baseband signal processing, such as ADC/DAC, gain adjusting, modulation/demodulation, encoding/decoding, and so on.

The RF device 22 may receive RF wireless signals via the antenna 23, convert the received RF wireless signals to baseband signals, which are processed by the baseband processing device 21, or receive baseband signals from the baseband processing device 21 and convert the received baseband signals to RF wireless signals, which are later transmitted via the antenna 23. The RF device 22 may also contain multiple hardware devices to perform radio frequency conversion. For example, the RF device 22 may include a mixer to multiply the baseband signals with a carrier oscillated in the radio frequency of the supported non-3GPP RATs, wherein the radio frequency may be 2.4 GHz or 5 GHz utilized in Wi-Fi systems, or may be 2.402~2.480 GHz utilized in BT systems, or another radio frequency, depending on the RAT in use.

In another embodiment, the baseband processing device 21 and the RF device 22 may be incorporated into a single chip.

In yet another embodiment, the wireless transceivers 10 and 20 may be incorporated into a single wireless transceiver. That is, the single wireless transceiver may include a combo RF device to support wireless transceiving to and from the roaming 3GPP network 120 and the non-3GPP network 130.

The controller 30 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communications with the roaming 3GPP network 120, controlling the wireless transceiver 20 for wireless communications with the non-3GPP network 130, storing and retrieving data (e.g., program code) to and from the storage device 40, sending a series of frame data (e.g. representing text messages, graphics, images, etc.) to the display device 50, and receiving user inputs or outputting signals via the I/O device 60.

In particular, the controller 30 coordinates the aforementioned operations of the wireless transceivers 10 and 20, the storage device 40, the display device 50, and the I/O device 60 for performing the methods of the present application.

In another embodiment, the controller 30 may be incorporated into the baseband processing device 11 or the baseband processing device 21, to serve as a baseband processor.

In yet another embodiment, the controller 30, the baseband processing device 11, and the RF device 12 may be incorporated into a single chip.

As will be appreciated by persons skilled in the art, the circuits of the controller 30 may include transistors that are configured in such a way as to control the operation of the circuits in accordance with the functions and operations described herein. As will be further appreciated, the specific structure or interconnections of the transistors may be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 40 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols, and/or the method of the present application.

The display device 50 may be a Liquid-Crystal Display (LCD), a Light-Emitting Diode (LED) display, an Organic LED (OLED) display, or an Electronic Paper Display (EPD), etc., for providing a display function. Alternatively, the display device 50 may further include one or more touch sensors for sensing touches, contacts, or approximations of objects, such as fingers or styluses.

The I/O device 60 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, the UE 110 may include more components, such as a video decoder for processing video signals, a Global Positioning System (GPS) device for use of some location-based services or applications, and/or a battery for powering the other components of the UE 110, etc. Alternatively, the UE 110 may include fewer components. For example, the UE 110 may not include the display device 50 and/or the I/O device 60.

Figure 3A:
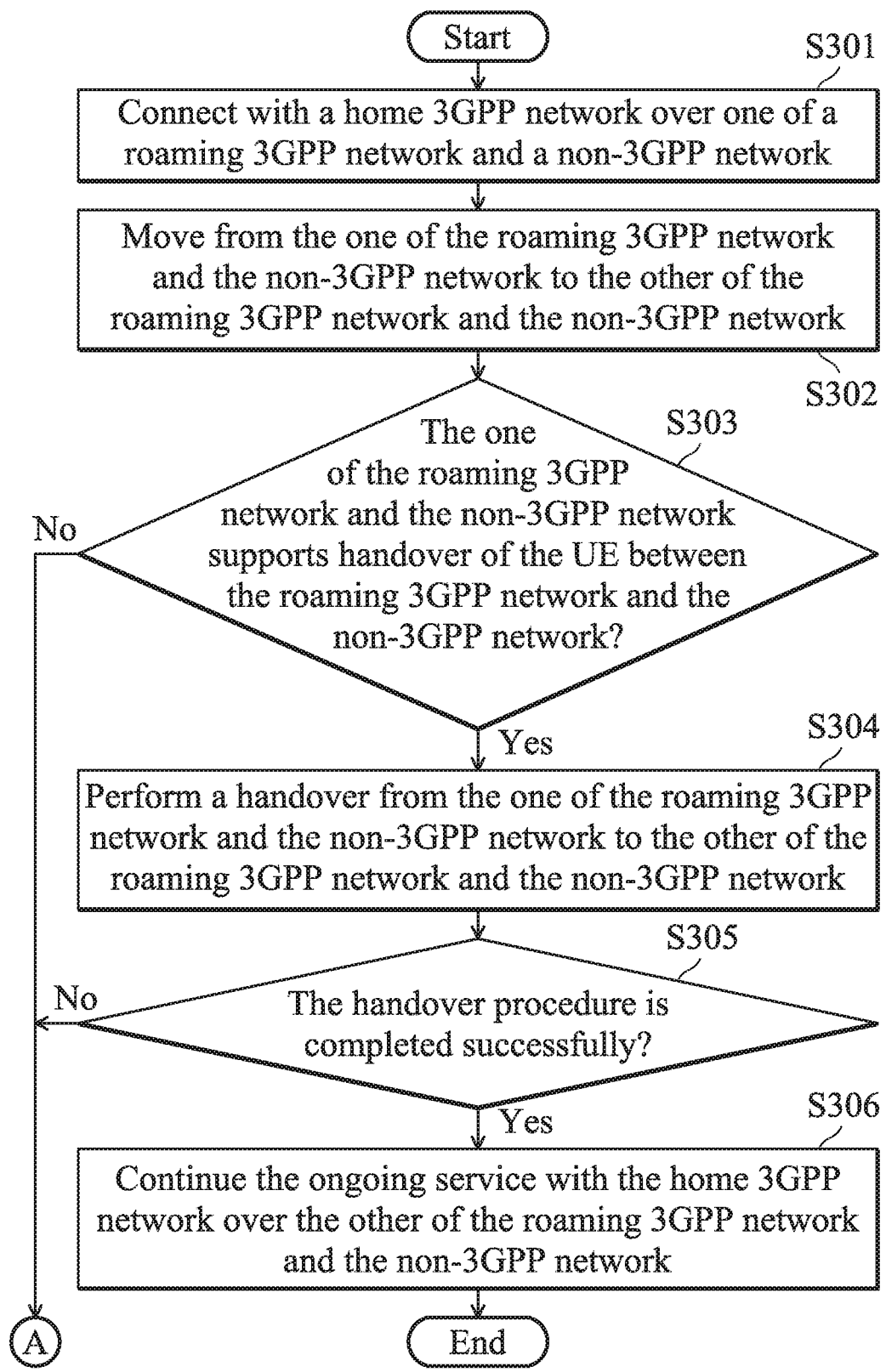
FIGS. 3A-3C show a flow chart illustrating the method for robust moving between a roaming 3GPP network and a non-3GPP network according to an embodiment of the application.
Figure 3B:
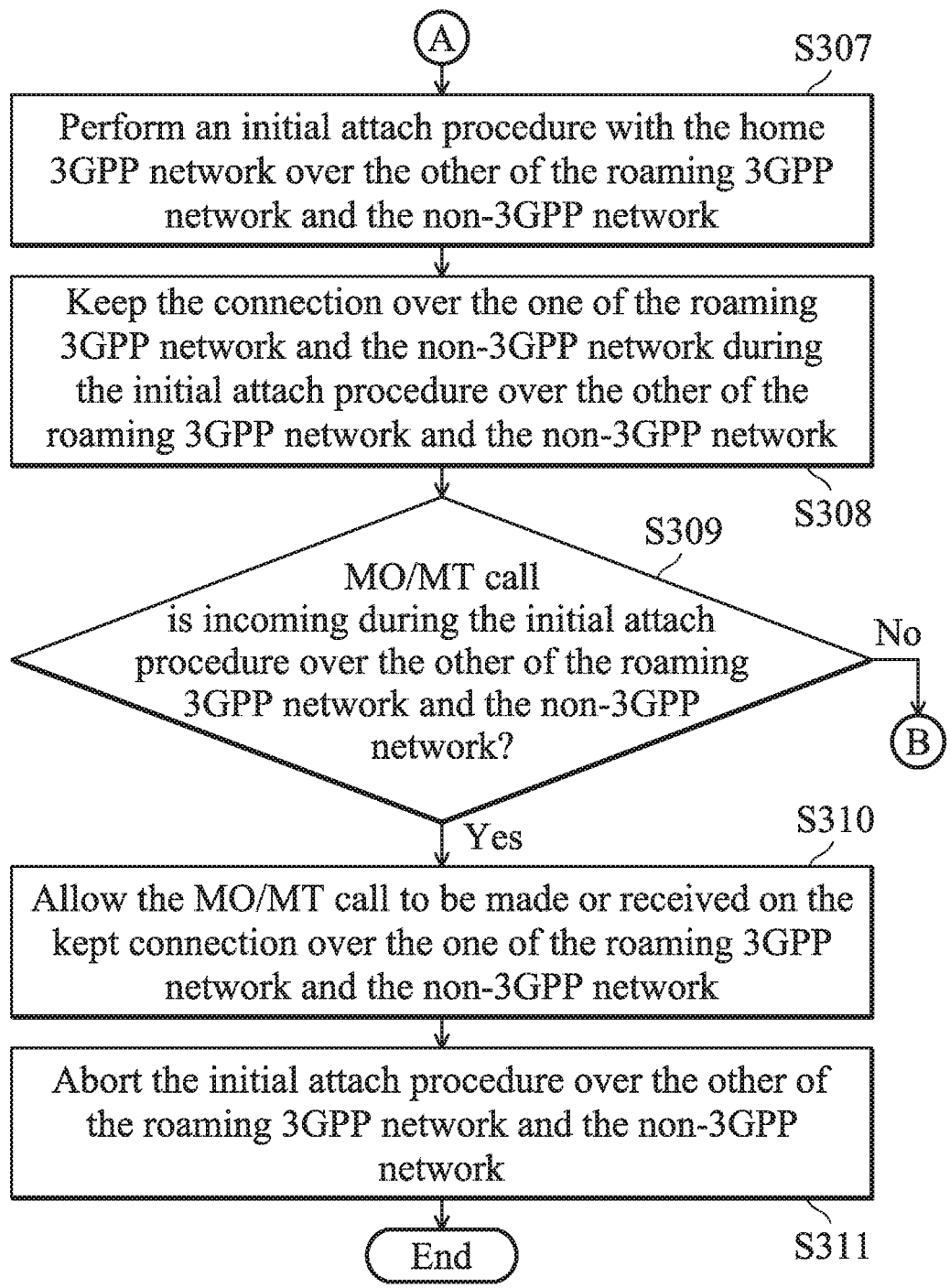
Figure 3C:
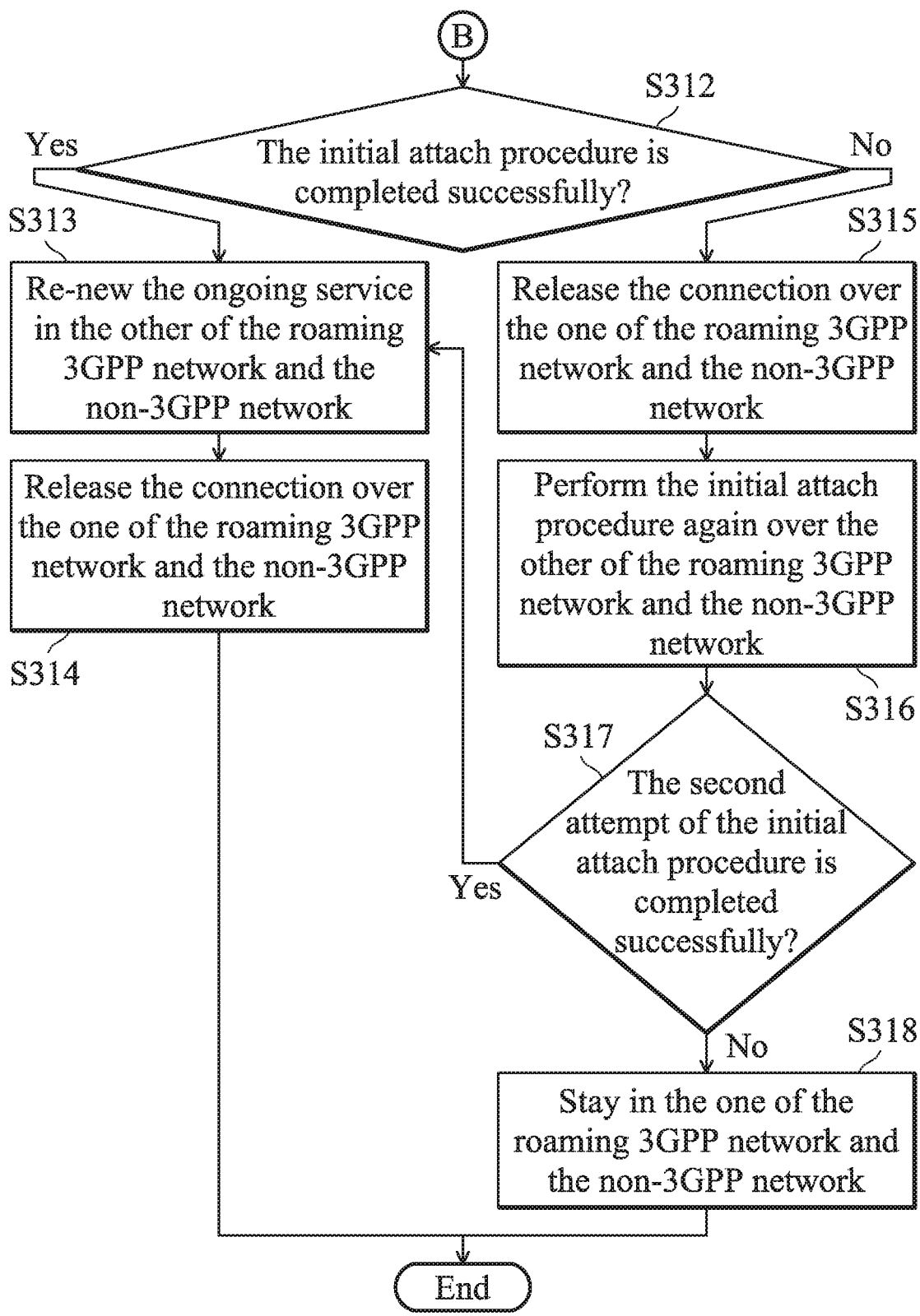

FIGS. 3A-3C show a flow chart illustrating the method for robust moving between a roaming 3GPP network and a non-3GPP network according to an embodiment of the application.

In this embodiment, the method for robust moving between a roaming 3GPP network and a non-3GPP network is applied to and executed by a UE (e.g., the UE 110).

To begin with, the UE connects with a home 3GPP network over one of a roaming 3GPP network and a non-3GPP network (step S301).

Specifically, both the UE and the home 3GPP network support data offloading from 3GPP network to non-3GPP network, and the UE is configured with non-3GPP access functionality being turned on and non-3GPP access being preferred over 3GPP access.

Next, the UE is moving from the one of the roaming 3GPP network and the non-3GPP network to the other of the roaming 3GPP network and the non-3GPP network (step S302).

Subsequently, the UE determines whether the one of the roaming 3GPP network and the non-3GPP network supports handover of the UE between the roaming 3GPP network and the non-3GPP network (step S303).

In one embodiment, the requirements for different 3GPP networks, such as the indication of whether an individual 3GPP network supports UE handover between the 3GPP network and non-3GPP network, may be built in the UE, and step S303 may be performed based on the built-in requirement information.

Subsequent to step S303, if the one of the roaming 3GPP network and the non-3GPP network supports handover of the UE between the roaming 3GPP network and the non-3GPP network, the UE performs a handover from the one of the roaming 3GPP network and the non-3GPP network to the other of the roaming 3GPP network and the non-3GPP network (step S304), and determines whether the handover procedure is completed successfully (step S305).

Subsequent to step S305, if the handover procedure is completed successfully, the UE continues the ongoing service with the home 3GPP network over the other of the roaming 3GPP network and the non-3GPP network (step S306), and the method ends.

Returning to step S303, if the one of the roaming 3GPP network and the non-3GPP network does not support handover of the UE between the roaming 3GPP network and the non-3GPP network, the UE performs an initial attach procedure with the home 3GPP network over the other of the roaming 3GPP network and the non-3GPP network (step S307), and keeps the connection over the one of the roaming 3GPP network and the non-3GPP network during the initial attach procedure over the other of the roaming 3GPP network and the non-3GPP network (step S308).

In one embodiment, during the initial attach procedure over the other of the roaming 3GPP network and the non-3GPP network, the UE allows an ongoing service to continue on the kept connection over the one of the roaming 3GPP network and the non-3GPP network.

Returning to step S305, if the handover procedure fails, the method proceeds to step S307.

Subsequent to step S308, the UE determines whether a Mobile Originated (MO) or Mobile Terminated (MT) call is incoming during the initial attach procedure over the other of the roaming 3GPP network and the non-3GPP network (step S309).

Subsequent to step S309, if an MO/MT call is incoming during the initial attach procedure over the other of the roaming 3GPP network and the non-3GPP network, the UE allows the MO/MT call to be made or received on the kept connection over the one of the roaming 3GPP network and the non-3GPP network (step S310), and aborts the initial attach procedure over the other of the roaming 3GPP network and the non-3GPP network (step S311), and the method ends.

Returning to step S309, if no MO/MT call is incoming during the initial attach procedure over the other of the roaming 3GPP network and the non-3GPP network, the UE determines whether the initial attach procedure is completed successfully (step S312).

Subsequent to step S312, if the initial attach procedure is completed successfully, the UE re-news the ongoing service in the other of the roaming 3GPP network and the non-3GPP network (step S313), and releases the connection over the one of the roaming 3GPP network and the non-3GPP network (step S314), and the method ends.

Returning to step S312, if the initial attach procedure fails, the UE releases the connection over the one of the roaming 3GPP network and the non-3GPP network (step S315), and performs the initial attach procedure again over the other of the roaming 3GPP network and the non-3GPP network (step S316).

Subsequent to step S316, the UE determines whether the second attempt of the initial attach procedure over the other of the roaming 3GPP network and the non-3GPP network is completed successfully (step S317).

Subsequent to step S317, if the second attempt of the initial attach procedure is completed successfully, the method proceeds to step S313. Otherwise, if the second attempt of the initial attach procedure fails, the UE stays in the one of the roaming 3GPP network and the non-3GPP network (step S318), and the method ends.

In view of the forgoing embodiments, it will be appreciated that the present application realizes robust moving between a roaming 3GPP network and a non-3GPP network, by enabling a UE moving between the roaming 3GPP network and the non-3GPP network to keep the connection over one of the roaming 3GPP network and the non-3GPP network during the initial attach procedure over the other of the roaming 3GPP network and the non-3GPP network. Advantageously, the ongoing service may continue on the original connection and incoming MO/MT calls may be made or received on the original connection, during the connection switching between the roaming 3GPP network and the non-3GPP network.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

What is claimed is:

1. A method, comprising:
   connecting with a home 3rd Generation Partnership Project (3GPP) network over one of a roaming 3GPP network and a non-3GPP network by a User Equipment (UE);
   determining whether the one of the roaming 3GPP network and the non-3GPP network supports handover of the UE between the roaming 3GPP network and the non-3GPP network in response to the UE moving from the one of the roaming 3GPP network and the non-3GPP network to the other of the roaming 3GPP network and the non-3GPP network;
   performing a first initial attach procedure with the home 3GPP network over the other of the roaming 3GPP network and the non-3GPP network by the UE, in response to that the handover of the UE from the one of the roaming 3GPP network and the non-3GPP network to the other of the roaming 3GPP network and the non-3GPP network fails when the one of the roaming 3GPP network and the non-3GPP network supports handover of the UE between the roaming 3GPP network and the non-3GPP network; keeping the connection over the one of the roaming 3GPP network and the non-3GPP network by the UE during the first initial attach procedure over the other of the roaming 3GPP network and the non-3GPP network;

allowing a voice call to be made or received on the kept connection over the one of the roaming 3GPP network and the non-3GPP network during the first initial attach procedure over the other of the roaming 3GPP network and the non-3GPP network; and aborting the first initial attach procedure over the other of the roaming 3GPP network and the non-3GPP network in response to the voice call being connected on the kept connection over the one of the roaming 3GPP network and the non-3GPP network.

2. The method as claimed in claim 1, further comprising:
allowing an ongoing service to continue on the kept connection over the one of the roaming 3GPP network and the non-3GPP network during the first initial attach procedure over the other of the roaming 3GPP network and the non-3GPP network.

3. The method as claimed in claim 1, wherein the first initial attach procedure over the other of the roaming 3GPP network and the non-3GPP network is performed in response to that the one of the roaming 3GPP network and the non-3GPP network does not support handover of the UE between the roaming 3GPP network and the non-3GPP network.

4. The method as claimed in claim 1, further comprising:
performing the handover from the one of the roaming 3GPP network and the non-3GPP network to the other of the roaming 3GPP network and the non-3GPP network by the UE in response to that the one of the roaming 3GPP network and the non-3GPP network supports handover of the UE between the roaming 3GPP network and the non-3GPP network.

5. The method as claimed in claim 1, further comprising:
releasing the connection over the one of the roaming 3GPP network and the non-3GPP network in response to that the first initial attach procedure over the other of the roaming 3GPP network and the non-3GPP network fails; and performing a second initial attach procedure over the other of the roaming 3GPP network and the non-3GPP network after releasing the connection over the one of the roaming 3GPP network and the non-3GPP network.

6. The method as claimed in claim 1, wherein both the UE and the home 3GPP network support data offloading from 3GPP network to non-3GPP network, and the UE is configured with non-3GPP access functionality being turned on and non-3GPP access being preferred over 3GPP access.

7. The method as claimed in claim 1, wherein the home 3GPP network is a fourth generation (4G) or fifth generation (5G) network, and the non-3GPP network is a Wireless-Fidelity (Wi-Fi) network.

8. A User Equipment (UE), comprising:
a first wireless transceiver, configured to perform wireless transmission and reception to and from a roaming 3rd Generation Partnership Project (3GPP) network;
a second wireless transceiver, configured to perform wireless transmission and reception to and from a non-3GPP network; and a controller, configured to:
connect with a home 3GPP network over one of the roaming 3GPP network and the non-3GPP network via the first wireless transceiver or the second wireless transceiver, determine whether the one of the roaming 3GPP network and the non-3GPP network supports handover of the UE between the roaming 3GPP network and the non-3GPP network in response to the UE moving from the one of the roaming 3GPP network and the non-3GPP network to the other of the roaming 3GPP network and the non-3GPP network, perform a first initial attach procedure with the home 3GPP network over the other of the roaming 3GPP network and the non-3GPP network via the first wireless transceiver or the second wireless transceiver, in response to that a handover of the UE from the one of the roaming 3GPP network and the non-3GPP network to the other of the roaming 3GPP network and the non-3GPP network fails when the one of the roaming 3GPP network and the non-3GPP network supports handover of the UE between the roaming 3GPP network and the non-3GPP network, keep the connection over the one of the roaming 3GPP network and the non-3GPP network during the first initial attach procedure over the other of the roaming 3GPP network and the non-3GPP network, allow a voice call to be made or received on the kept connection over the one of the roaming 3GPP network and the non-3GPP network during the first initial attach procedure over the other of the roaming 3GPP network and the non-3GPP network; and wherein the controller is further configured to abort the first initial attach procedure over the other of the roaming 3GPP network and the non-3GPP network in response to the voice call being connected on the kept connection over the one of the roaming 3GPP network and the non-3GPP network.

9. The UE as claimed in claim 8, wherein the controller is further configured to allow an ongoing service to continue on the kept connection over the one of the roaming 3GPP network and the non-3GPP network during the first initial attach procedure over the other of the roaming 3GPP network and the non-3GPP network.

10. The UE as claimed in claim 8, wherein the controller is further configured to abort the first initial attach procedure over the other of the roaming 3GPP network and the non-3GPP network in response to the voice call being connected on the kept connection over the one of the roaming 3GPP network and the non-3GPP network.

11. The UE as claimed in claim 8, wherein the controller is further configured to perform the handover of the UE from the one of the roaming 3GPP network and the non-3GPP network to the other of the roaming 3GPP network and the non-3GPP network via the first and second wireless transceiver in response to that the one of the roaming 3GPP network and the non-3GPP network supports handover of the UE between the roaming 3GPP network and the non-3GPP network.

12. The UE as claimed in claim 8, wherein the controller is further configured to release the connection over the one of the roaming 3GPP network and the non-3GPP network via the first wireless transceiver or the second wireless transceiver in response to that the first initial attach procedure over the other of the roaming 3GPP network and the non-3GPP network fails, and perform a second initial attach procedure over the other of the roaming 3GPP network and the non-3GPP network via the first wireless transceiver or the second wireless transceiver after releasing the connection over the one of the roaming 3GPP network and the non-3GPP network.

13. The UE as claimed in claim 8, wherein both the UE and the home 3GPP network support data offloading from 3GPP network to non-3GPP network, and the UE is configured with non-3GPP access functionality being turned on and non-3GPP access being preferred over 3GPP access.

14. The UE as claimed in claim 8, wherein the home 3GPP network is a fourth generation (4G) or fifth generation (5G) network, and the non-3GPP network is a Wireless-Fidelity (Wi-Fi) network.

* * * * *